US006605922B2

(12) United States Patent
Tamai et al.

(10) Patent No.: US 6,605,922 B2
(45) Date of Patent: Aug. 12, 2003

(54) BATTERY PACK PROVIDED WITH AUTHENTICATION CIRCUITRY

(75) Inventors: Mikitaka Tamai, Tsunagun (JP); Kazuhiro Toyoda, Sumoto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 10/303,756

(22) Filed: Nov. 26, 2002

(65) Prior Publication Data

US 2003/0102842 A1 Jun. 5, 2003

(30) Foreign Application Priority Data

Nov. 30, 2001 (JP) ........................................ 2001-367124

(51) Int. Cl.[7] ................................................ H02J 7/00
(52) U.S. Cl. ....................................................... 320/106
(58) Field of Search ................................. 320/106, 137, 320/DIG. 21, 107, 110, 112, 125, 128, 132, 134, 136, 144, 150, 153, DIG. 12, 114; 429/61

(56) References Cited

U.S. PATENT DOCUMENTS 5,350,993 A * 9/1994 Toya et al. .................. 320/106
5,608,306 A * 3/1997 Rybeck et al. .............. 320/106
6,255,800 B1 * 7/2001 Bork .......................... 320/115

FOREIGN PATENT DOCUMENTS

JP 63-118162 7/1988
JP 5-198293 8/1993

* cited by examiner

Primary Examiner—Edward H. Tso
Assistant Examiner—Pia Tibbits
(74) Attorney, Agent, or Firm—Wenderoth, Lind & Ponack, L.L.P.

(57) ABSTRACT

The battery pack is provided with output terminals and an authenticity discriminating circuit. The authenticity discriminating circuit is not supplied power from the rechargeable battery, nor is it connected to either the rechargeable battery or the output terminals. The authenticity discriminating circuit is provided with a receiver section which receives an activating radio wave from the electrical equipment, a transmitter section which sends an authentication radio wave as a signal to discriminate authenticity when the receiver section receives the activating radio wave, and a power supply section which converts the activating radio wave to direct current to supply electrical power to the receiver section and the transmitter section. When the battery pack is attached to electrical equipment and the authenticity discriminating circuit receives an activating radio wave, the power supply section supplies power to the receiver section and transmitter section, and the transmitter section sends an authentication radio wave to discriminate battery pack authenticity.

15 Claims, 7 Drawing Sheets

BATTERY PACK PROVIDED WITH AUTHENTICATION CIRCUITRY

This application is based on Application No. 367124 filed in Japan on Nov. 30, 2001, the content of which is incorporated hereinto by reference.

BACKGROUND OF THE INVENTION

This invention relates to a battery pack provided with authentication circuitry which can discriminate between genuine and imitation products.

A battery pack is attached to electrical equipment in a detachable manner to supply electric power to that equipment, or it is attached to a battery charger to be charged. Battery packs of various specifications are manufactured to correspond to electrical equipment parameters such as operating voltage and current. Battery pack characteristics such as output voltage and battery capacity are different for these different battery packs, and during battery charging, optimum charging current and charging time are set for each battery pack. Consequently, many different kinds of battery chargers have been developed to accommodate various battery packs. Attachment of a battery pack which does not meet battery charger or electrical equipment specifications invites charging problems such as over-charge or under-charge and electrical equipment malfunction. Use of an out-of-specification battery pack can be associated with electrical equipment or battery charger failure, and shortened battery pack life can be anticipated with repeated charging and discharging. Accordingly, a strategy is required to insure that only a battery pack meeting electrical equipment and battery charger specifications is attached.

Battery packs, developed to authenticate genuine versus imitation products, are roughly divided into two types. The first type is cited, for example, in Japanese Patent Application SHO 63-118132 (1988). For this type of battery pack, electrical equipment is provided with a region of projections and cavities on its battery attachment surface and authenticity is mechanically judged by shape. Battery pack attachment to electrical equipment is restricted to battery packs having a region of projections and cavities that fits with the electrical equipment. As a result, battery packs which meet electrical equipment specifications can be attached, and electrical equipment malfunction can be prevented.

However, discrimination of battery pack type by mechanical fit requires providing a region of projections and cavities on the electrical equipment and on the battery pack. This not only makes the shape of the battery pack exterior case complex, it has drawbacks such as making mass production unsuitable because different exterior cases are required corresponding to different types of battery packs. Further, it has the drawback that imitation battery packs with the same exterior shape as genuine battery packs cannot be discriminated. An inferior imitation battery pack with the same shape as a genuine battery pack may be returned to the manufacturer or service center as a defective product. It is then necessary to disassemble the imitation battery pack and confirm internal components to judge its authenticity, which costs time and money.

These drawbacks can be eliminated with a system, as cited in Japanese Patent Application HEI 5-198293 (1994), which electrically judges authenticity. A battery pack for electrically determining authenticity contains authenticity judging circuitry to communicate signals, such as identification (ID) signals, between electrical equipment and battery pack. Further, the battery pack is provided with a signal terminal to output authentication signals from the authenticity judging circuitry. When this battery pack is attached to electrical equipment or a battery charger, the signal terminal of the battery pack contacts a signal terminal provided on the electrical equipment or battery charger. Then battery pack authentication circuitry communicates signals with the electrical equipment or battery charger via mutually contacting signal terminals to determine authenticity. This battery pack sends and receives electrical signals via its signal terminal to allow determination whether the battery pack is proper or not.

However, since this battery pack's authentication circuitry is driven by the battery pack rechargeable battery, it has the drawback that it consumes electrical power. Power consumed by the authentication circuitry can be the cause of over-discharge of the rechargeable battery housed in the battery pack. A battery pack may contain not only authentication circuitry, but also protection circuitry to prevent over-charge and over-discharge. When both protection circuitry and authentication circuitry consume electrical power, the detrimental effect of over-discharge can occur particularly easily. Since protection circuitry continually monitors the state of the battery, consumption of rechargeable battery power is unavoidable. However, since authentication circuitry determines whether or not the product is genuine only when the battery pack is attached, its operating time is extremely limited. As a result, it is necessary to reduce authentication circuitry power consumption as much as possible, but due to circuit structure there is a limit to this reduction, and it cannot be reduced to zero. Further, this battery pack sends and receives authentication signals to and from electrical equipment via signal terminals. It has the drawback that If contact failure occurs at the signal terminals, the battery pack cannot be used even if it is a normally usable battery pack.

The present invention was developed to resolve these types of drawbacks. Thus it is a primary object of the present invention to provide a battery pack containing authentication circuitry which can discriminate authenticity without consuming power from the rechargeable battery housed in the battery pack, and further which does not malfunction due to such causes as terminal contact failure or resistance. Another important object of the present invention is to provide a battery pack with authentication circuitry which is not restricted in its location inside the battery pack, and which can be simply, easily, and efficiently produced in quantity. The above and further objects and features of the invention will more fully be apparent from the following detailed description with accompanying drawings.

SUMMARY OF THE INVENTION

The battery pack of the present invention is provided with a rechargeable battery, output terminals connected directly to the rechargeable battery or via a switching device, and an authenticity discriminating circuit that outputs a specified signal to the connected electrical equipment to discriminate battery pack authenticity. Electrical power from the rechargeable battery is not supplied to the authenticity discriminating circuit. Further, this authenticity discriminating circuit is not connected to either the rechargeable battery or to the output terminals. The authenticity discriminating circuit is provided with a receiver section to receive an activating radio wave sent from the connected electrical equipment, a transmitter section to send an authentication radio wave which is the carrier modulated by a specified authentication signal issued when the receiver section receives the activating radio wave, and a power supply section to convert the activating radio wave sent from the electrical equipment to direct current (DC) to supply power to the receiver section and transmitter section. The authenticity discriminating circuit receives the activating radio wave sent from the electrical equipment when the battery pack is attached, the power supply section supplies power to the receiver section and transmitter section, and the transmitter section sends the authentication radio wave to determine authenticity. (Note, the general term radio wave designates a wireless electromagnetic transmission and is not meant to specify or limit in any way the frequency band of those transmitted waves.)

This configuration of battery pack has the characteristic that authenticity can be discriminated without consuming power from the rechargeable battery housed in the battery pack. This is because the battery pack contains an authenticity discriminating circuit which outputs the battery pack's authentication signal to the connected electrical equipment, and this authenticity discriminating circuit is provided with a receiver section to receive the activating radio wave sent from the electrical equipment, a transmitter section to send the authentication radio wave when the receiver section receives the activating radio wave, and a power supply section to convert the activating radio wave sent from the electrical equipment to DC to supply power to the receiver and transmitter sections.

This configuration of battery pack does not supply electrical power to the authenticity discriminating circuit from its internal rechargeable battery, but rather the activating radio wave sent from the electrical equipment is converted to DC power and supplied to the receiver and transmitter sections. Therefore, internal rechargeable battery power is not consumed. As a result, rechargeable battery overdischarge due to authenticity discriminating circuit power consumption is reliably prevented. Further, since this authenticity discriminating circuit trades signals with the electrical equipment by sending and receiving radio waves, and is not connected to the rechargeable battery or to the output terminals, malfunction due to terminal contact failure or resistance can be eliminated. Still further, since the authenticity discriminating circuit of this battery pack does not require any wiring, the circuit can be located anywhere in the battery pack without restriction. Therefore, this battery pack has the characteristic that it can be simply, easily, efficiently, and inexpensively manufactured in quantity.

Finally, since genuine and imitation battery pack authenticity is discriminated by sending and receiving specified radio waves, even battery packs with the same exterior shape can be easily and reliably judged as genuine or imitation without disassembly. Therefore, the waste of time and resources discriminating between genuine and imitation products is minimized, and failures which are poor imitations are effectively excluded.

DETAILED DESCRIPTION OF THE INVENTION

Figure 1:
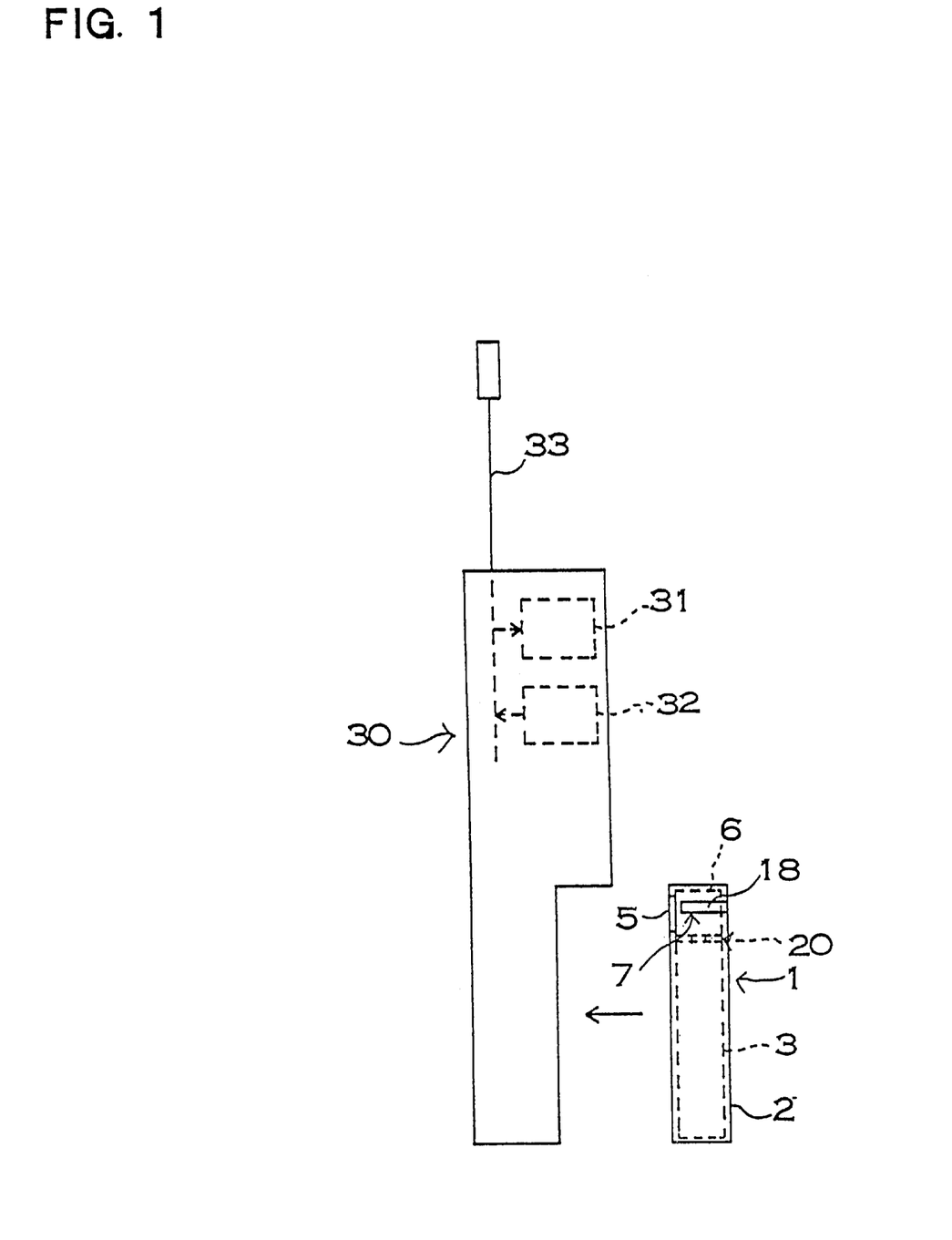
FIG. 1 is a side view showing an embodiment of the battery pack of the present invention attached to electrical equipment.
Figure 2:
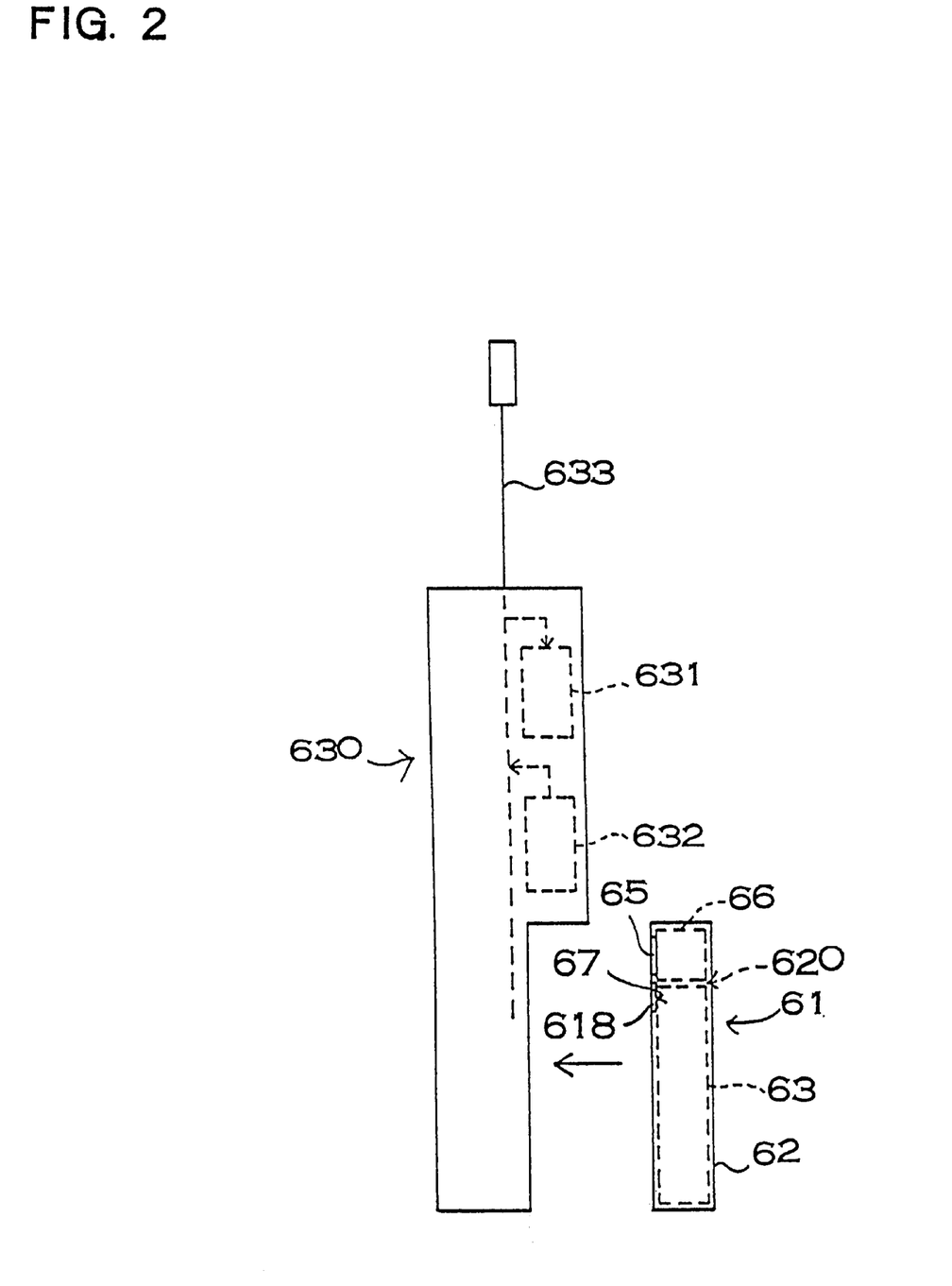
FIG. 2 is a side view showing another embodiment of the battery pack of the present invention attached to electrical equipment.

The battery pack 1, 61 shown in FIGS. 1 and 2 is attached in a detachable manner to electrical equipment 30, 630 which is a portable communication device. This battery pack 1, 61 is provided with a plastic case 2, 62, a rechargeable battery 3, 63 housed in the plastic case 2, 62, output terminals 5, 65 exposed at the surface of the plastic case 2, 62 and connected to the rechargeable battery 3, 63 either directly or via a switching device, a protection circuit 6, 66 for the rechargeable battery 3, 63 housed in the plastic case 2, 62, and an authenticity discriminating circuit 7, 67 which outputs a signal to the connected electrical equipment 30, 630 for discriminating the authenticity of the battery pack 1, 61.

Figure 3:
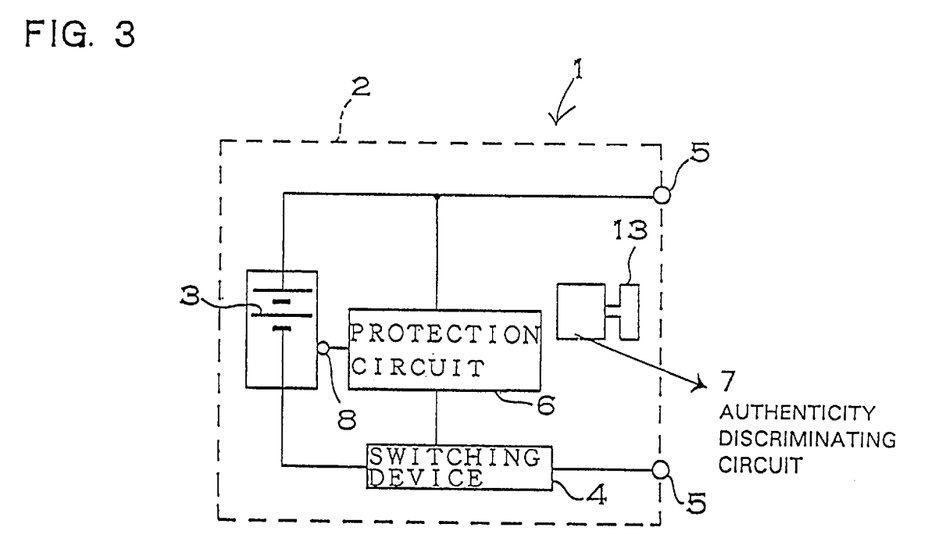
FIG. 3 is a circuit diagram showing an embodiment of the battery pack provided with authentication circuitry.

Turning to FIG. 3, a circuit diagram of the battery pack 1 is shown. In this battery pack 1, a switching device 4 is connected between the rechargeable battery 3 and the output terminals 5 and is controlled to switch on and off by the protection circuit 6. The switching device 4 is a field effect transistor (FET) or other transistor. The protection circuit 6 is connected to the rechargeable battery 3 and is supplied power from the rechargeable battery 3. The protection circuit 6 senses battery voltage or computes remaining battery capacity from the integrated value of battery charge and discharge currents, and controls the switching device 4 on and off to prevent battery over-charge, over-discharge, and current over-stress. In addition, the battery pack 1 of FIG. 3 has a temperature sensor 8 connected to the protection circuit 6. The temperature sensor 8 is disposed in close proximity to the rechargeable battery 3 to sense battery temperature. In this battery pack 1, if battery temperature rises above a set temperature, the temperature sensor 8 detects this and switches the switching device 4 off. Consequently, if battery temperature rises abnormally high, battery current is cut-off.

The authenticity discriminating circuit 7 communicates with the electrical equipment 30 to which the battery pack 1 is attached and issues a specified signal indicating the battery pack is authentic. Electric power to operate the authenticity discriminating circuit 7 is not supplied from the rechargeable battery 3. The authenticity discriminating circuit 7 contains a self-generating power circuit which derives electrical power from an activating radio wave sent from the electrical equipment 30. Consequently, the authenticity discriminating circuit 7 is not connected to the rechargeable battery 3, nor is it connected to either the output terminals 5 or the protection circuit 6. The authenticity discriminating circuit 7 is not connected to any of the circuitry contained in the battery pack 1, and it operates independently and in isolation from all other circuitry.

Figure 4:
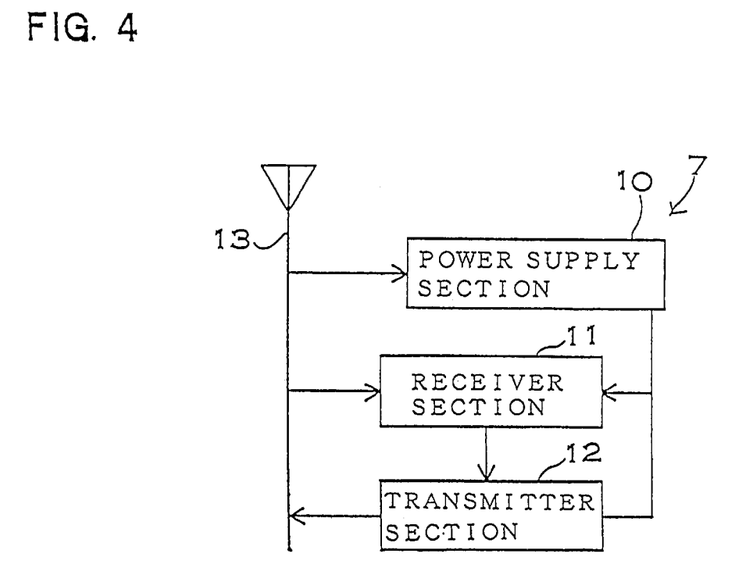
FIG. 4 is a block diagram showing an embodiment of the authenticity discriminating circuit.

As shown in the circuit diagram of FIG. 4, the authenticity discriminating circuit 7, which operates by self-generation of power, is provided with a power supply section 10 to convert an activating radio wave sent from the connected electrical equipment 30, which is a portable communication device, into DC electric power. In addition, the authenticity discriminating circuit 7 is provided with a receiver section 11 to receive the activating radio wave sent by the electrical equipment 30, and a transmitter section 12 to send an authentication radio wave as a signal to discriminate authenticity when the receiver section 11 receives the activating radio wave. The power supply section 10 supplies self-generated (induced) DC power to the receiver section 11 and transmitter section 12 to make them operational.

Figure 5:
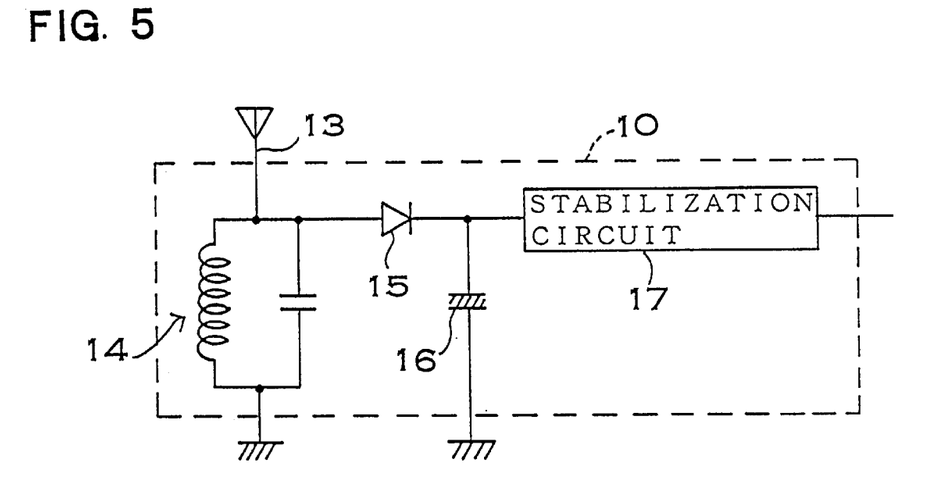
FIG. 5 is a circuit diagram showing an embodiment of the power supply section of an authenticity discriminating circuit.

As shown in the circuit diagram of FIG. 5, the power supply section 10 is provided with a diode 15 with excellent high frequency characteristics to rectify output from a resonant circuit 14 connected to an antenna 13, a smoothing capacitor 16 to smooth the rectified output from the diode 15, and a stabilization circuit 17 to stabilize the capacitor 16 output voltage. The resonant circuit 14 connected to the antenna 13 is tuned to the frequency of the carrier wave of the activating radio wave sent from the electrical equipment 30. The frequency of the carrier wave is in the microwave or milliwave range. For a battery pack which communicates with electrical equipment via Bluetooth communication protocol, the authenticity discriminating circuit 7 frequency is 2.45 GHz.

The receiver section 11 is provided with a high frequency circuit to amplify the activating radio wave which resonates with the antenna's resonant circuit and convert it to a low frequency via a mixing circuit and further select only the activating radio wave from a narrow frequency band, and a demodulating circuit to demodulate the signal amplified by the high frequency circuit and detect a calling signal included in the activating radio wave. When the battery pack 1 is attached to the electrical equipment 30, the electrical equipment 30 modulates the carrier with a specified calling signal and transmits it as the activating radio wave. The receiver section 11 receives the activating radio wave transmitted from the electrical equipment 30, detects the calling signal included in the activating radio wave, and outputs it to the transmitter section 12.

The transmitter section 12 is provided with a read only memory (ROM) which stores a specified signal, and a modulating transmitter circuit which modulates the carrier with the specified signal stored in ROM and supplies the modulated carrier to the antenna 13 for transmission when the calling signal is input from the receiver section. The ROM stores an encrypted specified signal to distinguish the battery pack.

When the battery pack is attached to electrical equipment and the authenticity discriminating circuit 7 receives an activating radio wave sent from the electrical equipment 30, the power supply section 10 supplies power to make the receiver section 11 and transmitter section 12 operational. The operating receiver section 11 receives the activating radio wave, detects the calling signal, and inputs the detected calling signal to the transmitter section 12. When the calling signal is input, the transmitter section 12 modulates the carrier with the specified signal stored in ROM, and transmits the authentication radio wave from the antenna 13. The specified signal sent from the transmitter section 12 is received by the electrical equipment to which the battery pack is attached. The electrical equipment detects the specified signal from the authentication radio wave and compares that specified signal with a previously stored specified signal. If the specified signal from the received authentication radio wave is the same as the stored signal, the battery pack is judged to be genuine. If the received and stored signals are different, the battery pack is judged as not genuine. Only when the electrical equipment determines the battery pack to be genuine, does it turn on an internal power switch (not illustrated) to permit power to be supplied from the battery pack to the electrical equipment. If the electrical equipment determines the battery pack not genuine, it maintains the power switch in the off position and does not allow power to be supplied from the battery pack to the electrical equipment.

In the case where the electrical equipment 30, 630 is a portable communication device such as a portable telephone or portable wireless device as shown in FIGS. 1 and 2, the wireless transmitter section 32, 632 of the portable communication device can be used to send the activating radio wave, and the wireless receiver section 31, 631 can be used to receive the specified signal. Consequently, there is no need to provide special purpose wireless transmitter and receiver sections in this type of electrical equipment 30, 630 to communicate with the authenticity discriminating circuit 7, 67. Electrical equipment, which is not a portable communication device, must house a wireless transmitter and receiver section to communicate with the authenticity discriminating circuit in the attached battery pack and determine if the battery pack is genuine.

When the electrical apparatus to which the battery pack is attached is a battery charger, the battery charger will house a wireless transmitter and receiver section and the wireless receiver section will control a power switch on and off. When a genuine battery pack is attached to the battery charger, the authenticity discriminating circuit and the battery charger communicate, and the battery charger's power switch is turned on allowing the battery pack to be charged. When a battery pack which is not genuine is attached, the battery charger's power switch is maintained in the off position not allowing battery charging.

Figure 6:
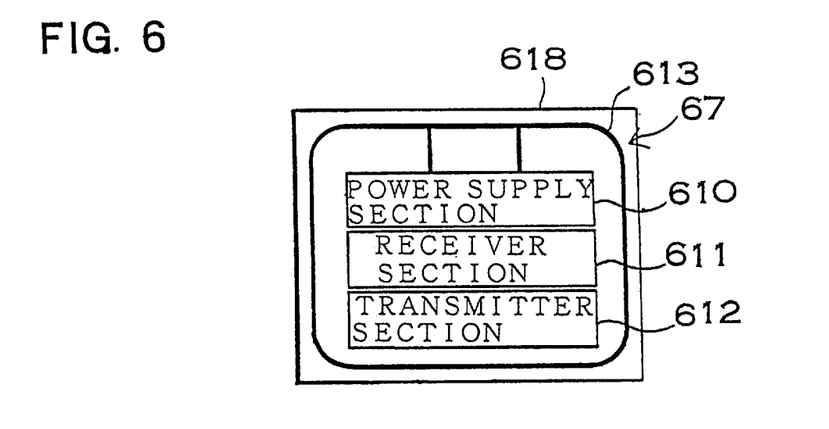
FIG. 6 is an abbreviated structural diagram showing an embodiment of an authenticity discriminating chip which implements the authenticity discriminating circuit.
Figure 7:
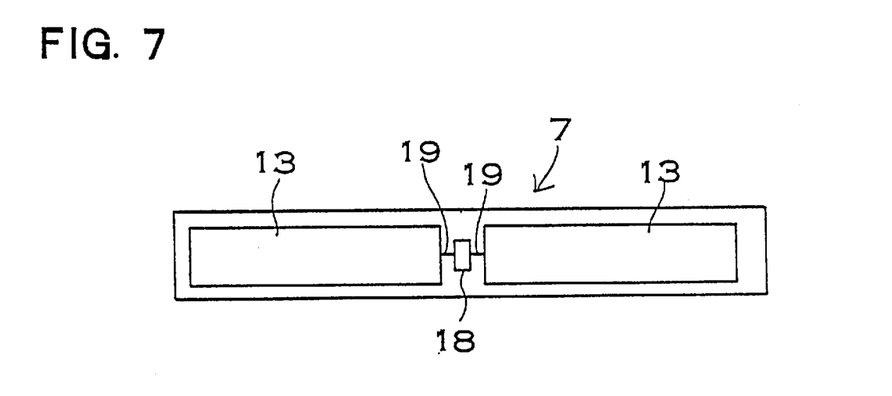
FIG. 7 is a plan view showing another embodiment of an authenticity discriminating chip which implements the authenticity discriminating circuit.

As shown in FIG. 6, the authenticity discriminating circuit 67 housed in the battery pack is an integrated circuit (IC) authenticity discriminating chip 618 with an integrated antenna 613, or as shown in FIG. 7, it is an IC authenticity discriminating chip 18 with an externally attached antenna 13. An authenticity discriminating circuit 7 which has an externally attached antenna 13 as shown in FIG. 7, has antenna output terminals 19 established on the authenticity discriminating chip 18 and the antenna 13 connects to those antenna output terminals 19. This type of authenticity discriminating circuit 7 can have a large space between its antenna 13 and the electrical equipment 30 antenna 33 because the authenticity discriminating circuit 7 antenna 13 can be made large to increase its gain. Since an on-chip integrated antenna 613 is small, as shown in FIG. 2, the authenticity discriminating chip 618 must be positioned as close as possible to the electrical equipment 630 antenna 633 to insure reliable communication between the authenticity discriminating circuit 67 and electrical equipment 630. The IC authenticity discriminating chip 18, 618 is disposed with separation from the rechargeable battery 3, 63. A given distance is provided between the rechargeable battery 3, 63 and the authenticity discriminating chip 18, 618 to prevent the chip from contacting the external case of the rechargeable battery 3, 63. The authenticity discriminating chip may also be housed inside the battery pack with insulating material disposed between the chip and the external case of the rechargeable battery. By disposing the authenticity discriminating chip 18, 618 separated in this manner from the external case of the rechargeable battery, good transmission and reception of radio waves is attained. In FIG. 6, 610 is the power supply section, 611 is the receiver section, and 612 is the transmitter section.

Figure 8:
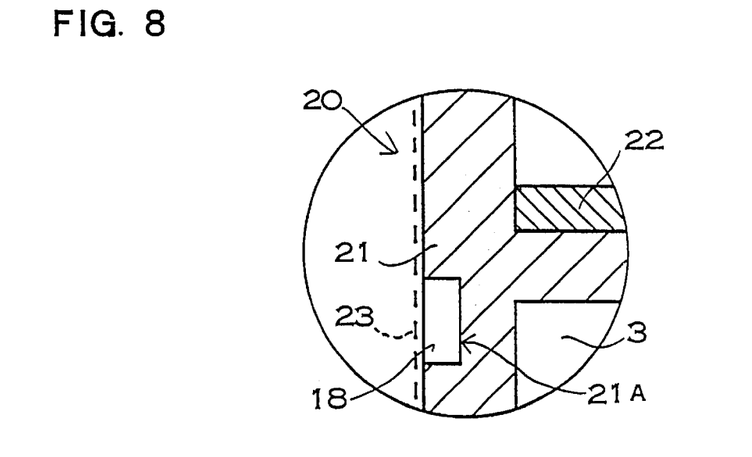
FIG. 8 is an enlarged cross section view showing important elements of an embodiment of an authenticity discriminating chip attached to the core pack.
Figure 9:
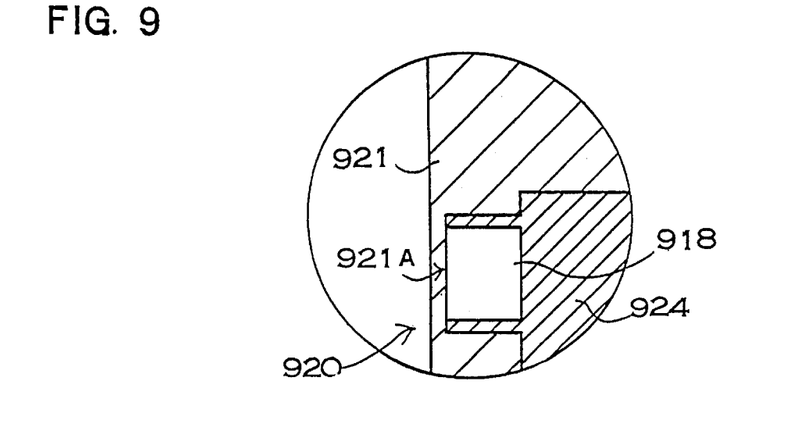
FIG. 9 is an enlarged cross section view showing important elements of another embodiment of an authenticity discriminating chip attached to the core pack.

In the battery pack 1, 61 shown in FIGS. 1 and 2, a battery core pack 20, 620 is inserted inside the plastic case 2, 62 to retain the rechargeable battery 3, 63 in a fixed position within the plastic case 2, 62. The core pack 20, 620 is a unit which holds together the rechargeable battery 3, 63, the protection circuit 6, 66, and all other necessary parts. As shown in FIGS. 8 and 9, the authenticity discriminating chips 18, 918 of these battery packs are attached to holders 21, 921 provided for the core packs 20, 920 and are retained in fixed positions in the battery packs. A holder 21, 921 is a molded plastic part housed in the battery pack to hold a circuit board 22 mounted with protection circuit 6 electronic parts in a fixed position with respect to the rechargeable battery 3, or to also hold the battery pack output terminals in a fixed position. A holder 21 which holds the circuit board 22 has a circuit board 22 retaining section allowing the circuit board 22 to fit in a specified location, and a rechargeable battery 3 insertion section to hold the battery in a fixed position. A holder 21 that keeps output terminals in a fixed position is molded in a shape which allows metal plate output terminals to be held fixed and also allows the circuit board 22 and rechargeable battery 3 to be connected in fixed positions.

The holder 21 shown in FIG. 8 retains the circuit board 22 and the rechargeable battery 3, and is also provided with a cavity 21A on its outside surface to fit the authenticity discriminating chip 18. In a battery pack housing this holder 21, the authenticity discriminating chip 18 can be disposed near the outside surface of the battery pack. This battery pack has the characteristic that the authenticity discriminating chip 18 can be disposed close to the electrical equipment 30 antenna 33, and the chip can be disposed separated from the external case of the rechargeable battery 3. The broken line in FIG. 8 is a seal adhering to the surface of the holder 21 to prevent the authenticity discriminating chip 18 from falling out of the holder 21. In the holder 921 shown in FIG. 9, the cavity 921A to fit the authenticity discriminating chip 918 is provided on inside surface of the holder 921. An authenticity discriminating chip 918 disposed on the inside surface of the holder 921 is inserted and buried in a fixed location by molded plastic 924 which forms the plastic case. However, the authenticity discriminating chip may also be fixed in the cavity on the inside surface of the holder by fasteners such as bond or adhesive tape. This holder 921 has the characteristic that the authenticity discriminating chip 918 can be solidly retained.

A battery pack provided with authentication circuitry as described above is manufactured by the following process steps.

(1) The circuit board 22 and protection circuit devices and parts to implement the protection circuit 6 are connected with the rechargeable battery 3 to make the battery core pack 20. This core pack 20 connects the circuit board 22, and parts such as the temperature sensor 8 to the battery and holds them in fixed positions via the holder 21. Further, the cavity 21A on the holder 21 retains the authenticity discriminating chip 18 in a fixed position. The authenticity discriminating chip 18 is fixed to the holder 21 by bonding, or it is fixed by insertion into a holder 21 cavity 21A, or it is held on the surface by adhering a seal which is larger than the authenticity discriminating chip 18.

(2) The battery core pack 20 is temporarily retained inside the open plastic mold cavity (not illustrated). A core pack 20 having a holder 21 can be temporarily held in a fixed position via the holder 21.

(3) The mold is closed and molten plastic resin is injected into the mold cavity to form the plastic case 2. Low temperature molding resin such as polyamide or polyurethane are used as the synthetic resin injected into the mold cavity. Since these synthetic resins soften at low temperatures and also have low viscosity when molten, they can be molded at low temperature and pressure compared to other synthetic resins. The time required for molding can be reduced for a plastic that can be molded at low temperature and pressure, and in addition detrimental effects of molding heat and injection pressure on electronic parts can be decreased. In particular, in a battery pack where the protection circuit 6 and authenticity discriminating circuit 7 are inserted into the mold to form the plastic case 2, the effects of molding heat on the protection circuit 6 and authenticity discriminating circuit 7 can be decreased.

(4) The molten resin is cooled, and the formed plastic case 2 is removed from the mold. The formed plastic case 2 removed from the mold has the core pack 20 inserted and fixed within, and the protection circuit 6, temperature sensor 8, and authenticity discriminating chip 18 are attached to the holder 21 of the core pack 20. Consequently, a battery pack fabricated by this method has a plastic case 2 which houses the rechargeable battery 3, protection circuit 6, temperature sensor 8, and authenticity discriminating circuit 7.

Since the battery pack described above is made by inserting the core pack 20 in the plastic case 2 mold, it has the characteristic that it can be inexpensively manufactured in quantity. As shown in FIG. 9, the authenticity discriminating chip 918 is inserted and buried in the molding resin 924 for the plastic case, allowing ample protection for the authenticity discriminating circuit from the outside, and not allowing it to be discerned. However, the battery pack of the present invention is not restricted to fabrication by inserting a rechargeable battery 3 or core pack 20 inside the mold to form a plastic case 2. The rechargeable battery and protection circuit may be installed in a previously molded plastic case, or the unit may also be covered by heat-shrink tubing. These types of battery packs can also be assembled by attaching an authenticity discriminating chip to a holder.

Figure 10:
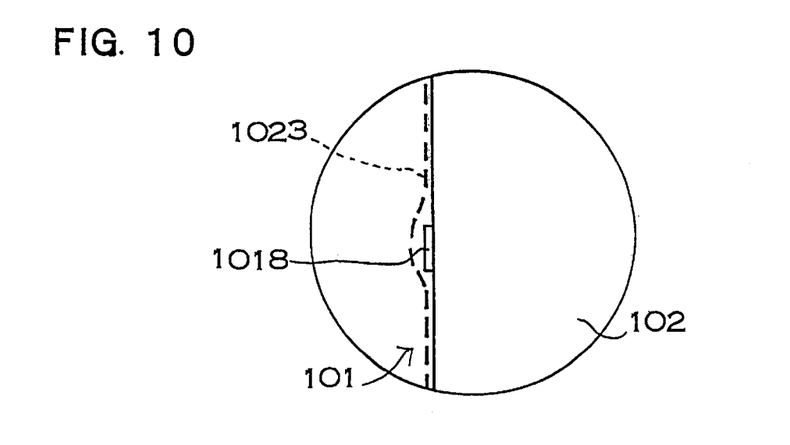
FIG. 10 is an enlarged side view showing important elements of an embodiment of an authenticity discriminating chip attached to the battery pack.
Figure 11:
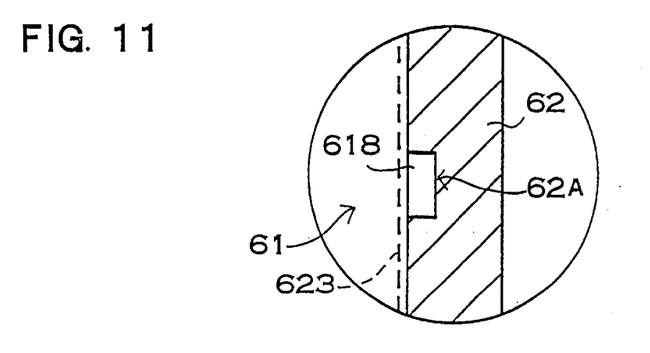
FIG. 11 is an enlarged cross section view showing important elements of another embodiment of an authenticity discriminating chip attached to the battery pack.

Further, as shown in FIG. 10, the authenticity discriminating chip 1018 can also be fixed to outside surface of the battery pack plastic case 102 by adhesion of a seal 1023. As shown in FIG. 11, a cavity 62A can also be provided in the outside surface of the plastic case 62, the authenticity discriminating chip 618 can be inserted into this cavity 62A, and the chip can be held in place by adhesion of a seal 623. A battery pack 101, 61 of the type shown in these figures has the characteristic that an authenticity discriminating chip 1018, 618 can be fixed to the outside surface of the plastic case 102, 62 in an extremely simple manner. Further, since the authenticity discriminating chip 618 can be disposed on the outside surface of the plastic case 62, it has the characteristic that the chip can be put in close proximity to the electrical equipment 630 antenna 633 and separated from the rechargeable battery 63 external case. However, although it is not illustrated, a cavity may also be provided for insertion of the authenticity discriminating chip on the inside surface of the plastic case. In this type of battery pack, the authenticity discriminating chip can be amply protected from the outside, and in addition, the authenticity discriminating chip cannot be easily removed from the outside.

Figure 12:
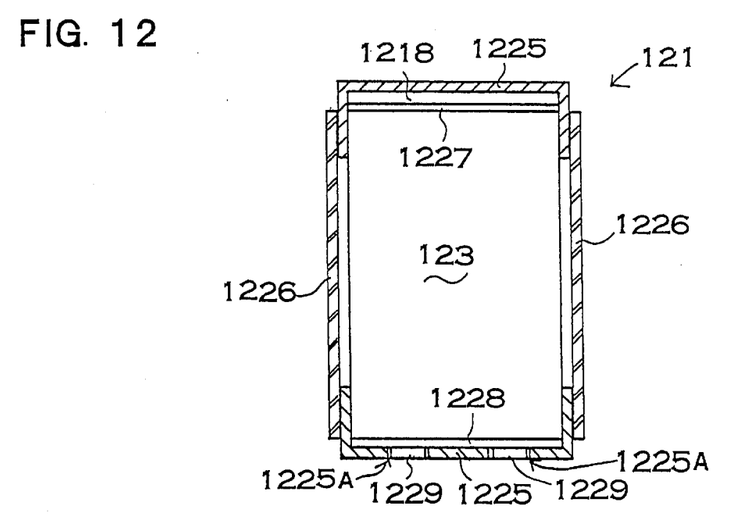
FIG. 12 is a cross section view showing another embodiment of a battery pack housing an authenticity discriminating chip.

The battery pack may also have a configuration as shown in FIG. 12. This battery pack 121 has both ends of the rechargeable battery 123 fitted with plastic caps 1225, and the open ends of those caps 1225 are held in fixed positions by a label seal 1226 adhered to the sides of the rechargeable battery 123. In this battery pack 121, the authenticity discriminating chip 1218 is disposed at one end of the rechargeable battery 123 via insulating material 1227, and a terminal board 1228 is disposed at the other end of the rechargeable battery 123. Output terminals 1229 are fixed to the side of the terminal board 1228 opposite the side adjacent to the rechargeable battery 123. Terminal windows 1225A are opened through cap 1225 disposed at the terminal board 1228 end to expose the output terminals 1229.

Figure 13:
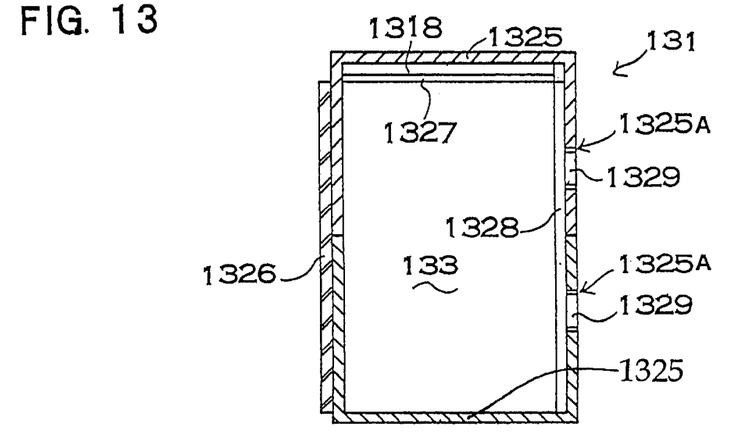
FIG. 13 is a cross section view showing another embodiment of a battery pack housing an authenticity discriminating chip.

Further, in the battery pack 131 shown in FIG. 13, the terminal board 1328 is disposed on the side of the rechargeable battery 133. This battery pack 131 has both ends of the rechargeable battery 133 fitted with plastic caps 1325, and the open ends of those caps 1325 extend to the middle of the rechargeable battery 133. The open ends of the upper and lower caps 1325 are held in fixed positions by a label seal 26 adhered to the side of the battery pack 131. Terminal windows 1325A are opened to expose the output terminals 1329 through the upper and lower caps 1325 at positions corresponding to the output terminals 1329 on the terminal board 1328 disposed on the side of the rechargeable battery 133. In FIG. 13, 1318 is the authenticity discriminating chip and 1327 is insulating material.

The rechargeable battery 3 housed in the battery pack is a rechargeable secondary battery such as a lithium ion battery, a nickel hydrogen battery, or a nickel cadmium battery.

Figure 14:
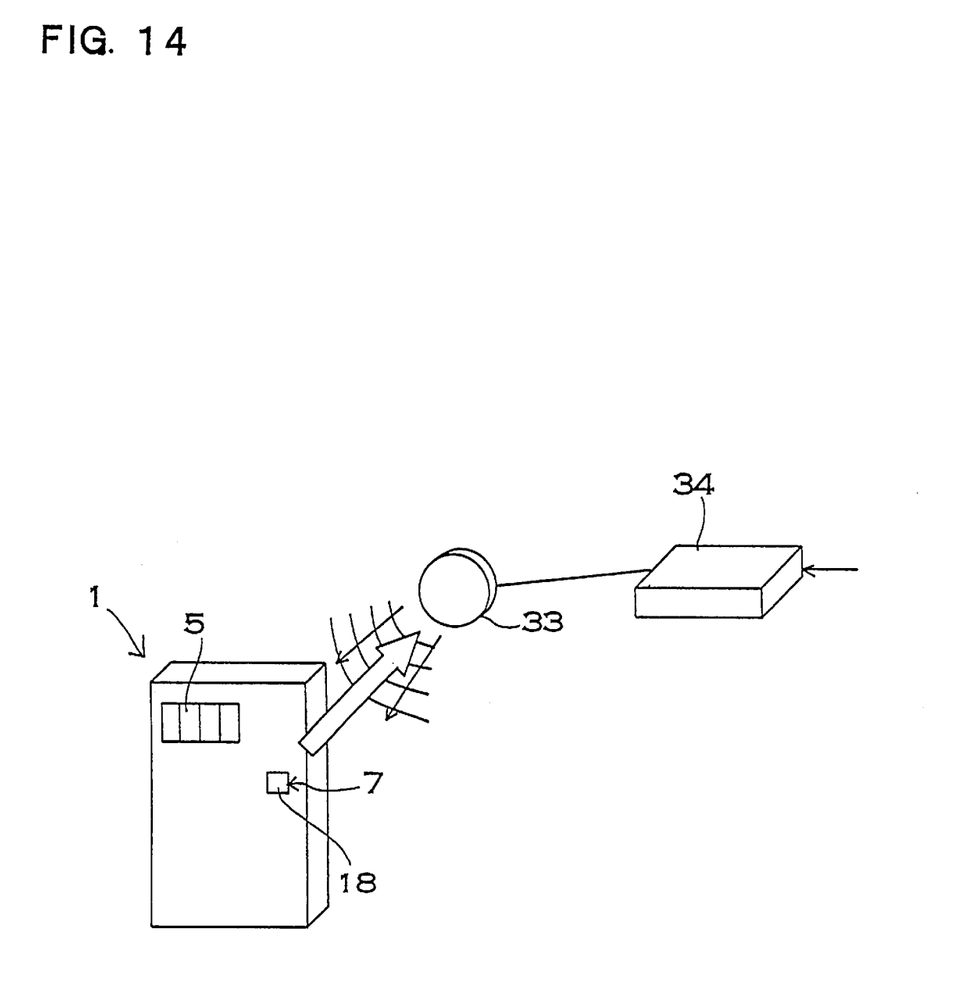
FIG. 14 is an abbreviated oblique view showing a battery pack housing an authenticity discriminating circuit communicating to discriminate authenticity.

When a battery pack fails, a reader 34, as shown in FIG. 14, is used to communicate with the authenticity discriminating circuit 7 housed in the battery pack 1 to confirm whether or not the battery pack is genuine. The reader 34 is a circuit which communicates with the authenticity discriminating circuit 7 to determine if the battery pack is genuine or not. Specifically, the reader 7 houses with a wireless transmitter section to send an activating radio wave to the battery pack 1, and a wireless receiver section to receive the battery pack's authentication radio wave. The reader 34 determines whether or not the authentication radio wave received by the receiver section is a specified signal for a genuine product, and thereby judges whether or not the battery pack is genuine. A battery pack 1 judged to be a genuine product by the reader 34 is repaired, but there is no need to repair a battery pack judged not genuine because it cannot be used by the electrical equipment 30.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A battery pack provided with authentication circuitry, the battery pack comprising:
   a rechargeable battery;
   output terminals connected to the rechargeable battery directly or via a switching device; and
   an authenticity discriminating circuit to output a battery pack authenticity discriminating signal to an electrical equipment to which the battery pack is attached;
   wherein the rechargeable battery does not supply electric power to the authenticity discriminating circuit;
   wherein the authenticity discriminating circuit comprises a receiver section to receive an activating radio wave sent from the electrical equipment to which the battery pack is attached, a transmitter section to send an authentication radio wave as the authenticity discriminating signal when the receiver section receives an activating radio wave, and a power supply section to convert the activating radio wave sent from the attached electrical equipment into direct current electrical power to supply to the receiver section and the transmitter section; and
   wherein the authenticity discriminating circuit supplies power to the receiver section and the transmitter section by the power supply section when the battery pack is attached to the electrical equipment and the electrical equipment sends an activating radio wave to the power supply section, and the transmitter section sends an authentication radio wave to discriminate battery pack authenticity.

2. A battery pack provided with authentication circuitry as recited in claim 1 wherein the authenticity discriminating circuit is housed in the battery pack as an integrated circuit (IC) authenticity discriminating chip.

3. A battery pack provided with authentication circuitry as recited in claim 2 wherein the authenticity discriminating chip is inserted into and fixed in a plastic case in which part of the rechargeable battery or the entire rechargeable battery is inserted into and fixed in.

4. A battery pack provided with authentication circuitry as recited in claim 1 wherein the battery pack is attachable to and detachable from a portable communication device housing a wireless transmitter section and a wireless receiver section, and the authenticity discriminating circuit housed in the battery pack communicates with the wireless transmitter section and a wireless receiver section of the portable communication device to which the battery pack is attached to discriminate the battery pack's authenticity.

5. A battery pack provided with authentication circuitry as recited in claim 1 wherein the authenticity discriminating circuit receives a microwave activating radio wave and transmits a microwave authentication radio wave.

6. A battery pack provided with authentication circuitry as recited in claim 2 wherein the authenticity discriminating chip contains an integrated antenna.

7. A battery pack provided with authentication circuitry as recited in claim 2 wherein the authenticity discriminating chip is provided with antenna output terminals, and an antenna is connected to those antenna output terminals.

8. A battery pack provided with authentication circuitry as recited in claim 1 wherein the battery pack contains a holder and the authenticity discriminating circuit attached to this holder.

9. A battery pack provided with authentication circuitry as recited in claim 2 wherein a holder, with the authenticity discriminating chip connected, is inserted in the plastic case.

10. A battery pack provided with authentication circuitry as recited in claim 2 wherein the authenticity discriminating chip is fixed to the surface of the plastic case with an adhesive seal.

11. A battery pack provided with authentication circuitry as recited in claim 2 wherein the authenticity discriminating chip is disposed in a manner separating it from the external case of the rechargeable battery.

12. A battery pack provided with authentication circuitry as recited in claim 11 wherein insulating material is introduced between the authenticity discriminating chip and the external case of the rechargeable battery.

13. A battery pack provided with authentication circuitry as recited in claim 1 wherein the authenticity discriminating circuit transmits an authentication radio wave according to Bluetooth communication protocol.

14. A battery pack provided with authentication circuitry as recited in claim 1 wherein the transmitter section of the authenticity discriminating circuit transmits an authentication radio wave which is a carrier wave modulated with an identification (ID) signal.

15. A battery pack provided with authentication circuitry as recited in claim 1 wherein the battery pack contains a rechargeable battery protection circuit, and power is supplied from the rechargeable battery to that protection circuit.

* * * * *